US012631345B2

(12) United States Patent
Freeman et al.

(10) Patent No.: US 12,631,345 B2
(45) Date of Patent: May 19, 2026

(54) SYSTEM AND METHOD FOR PROVIDING DOMESTIC HOT WATER AND/OR SPACE HEATING WITHIN A BUILDING, AND A REMOVABLE COVER OF A STORAGE VESSEL

(71) Applicant: Mitsubishi Electric Corporation, Tokyo (JP)

(72) Inventors: James Freeman, Livingston (GB); Georgeanna Kawaley, Livingston (GB); Christopher Olkis, Livingston (GB)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 127 days.

(21) Appl. No.: 18/610,321

(22) Filed: Mar. 20, 2024

(65) Prior Publication Data
US 2024/0328632 A1 Oct. 3, 2024

(30) Foreign Application Priority Data
Mar. 28, 2023 (EP) .................................... 23164515

(51) Int. Cl.
*F24D 3/08* (2006.01)
*F24D 3/00* (2022.01)
(Continued)

(52) U.S. Cl.
CPC .............. *F24D 3/005* (2013.01); *F24D 3/08* (2013.01); *F24D 3/18* (2013.01); *F24D 19/1078* (2013.01);
(Continued)

(58) Field of Classification Search
CPC ........ F24H 15/375; F24S 60/30; F24D 17/02; F24D 11/0221; F24D 11/0235; F24D 19/1078; F24D 3/08; F28D 20/0043
See application file for complete search history.

(56) References Cited

FOREIGN PATENT DOCUMENTS

| AT | 10951 U1 | 1/2010 |
| CN | 1865783 A | 11/2006 |

(Continued)

OTHER PUBLICATIONS

Extended European Search Report mailed on Sep. 7, 2023, received for EP Application 23164515.1, 9 pages.

*Primary Examiner* — Frantz F Jules
*Assistant Examiner* — Martha Tadesse
(74) *Attorney, Agent, or Firm* — XSENSUS LLP

(57) ABSTRACT
A system and method for providing domestic hot water and/or space heating within a building. The system comprises at least one storage vessel comprising a removable cover, wherein an internal volume of the storage vessel is fluidly connected to a source of sewage and/or wastewater from one or more buildings, a water-source heat pump, at least one solar thermal collector, at least one heat transfer circuit. The at least one heat transfer circuit includes at least one fluid line containing a heat transfer fluid, and a controller for controlling an operation of the system. The system has an operation mode in which the controller of the system is configured to connect the at least one solar thermal collector to the at least one storage vessel via the at least one fluid line. The system stores a heat output from the at least one solar thermal collector in sewage and/or wastewater.

18 Claims, 8 Drawing Sheets

Figure 1:
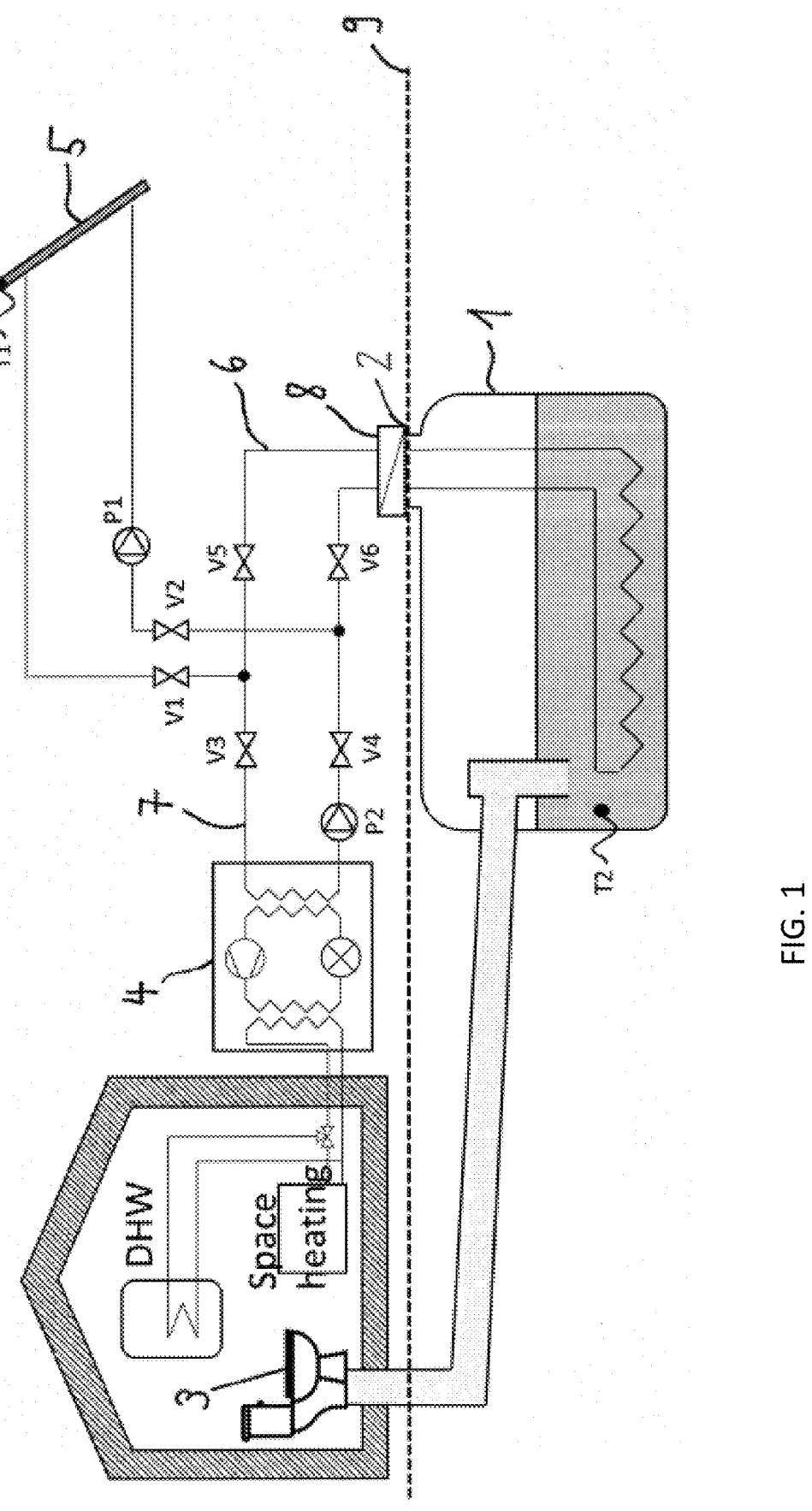

(51) Int. Cl.

| | |
|---|---|
| *F24D 3/18* | (2006.01) |
| *F24D 19/10* | (2006.01) |
| *F24S 50/40* | (2018.01) |
| *F24S 60/30* | (2018.01) |

(52) U.S. Cl.
CPC ............... *F24S 50/40* (2018.05); *F24S 60/30* (2018.05); *F24D 2200/12* (2013.01); *F24D 2200/20* (2013.01); *F24D 2220/042* (2013.01)

(56) References Cited

FOREIGN PATENT DOCUMENTS

| | | | | | |
|---|---|---|---|---|---|
| DE | 202006005592 | U1 | * | 8/2007 | .......... F24D 11/0221 |
| DE | 102010006882 | A1 | * | 8/2011 | ......... F28D 20/0043 |
| JP | 2015052434 | A | * | 3/2015 | |

* cited by examiner

SYSTEM AND METHOD FOR PROVIDING DOMESTIC HOT WATER AND/OR SPACE HEATING WITHIN A BUILDING, AND A REMOVABLE COVER OF A STORAGE VESSEL

This application is based upon and claims the benefit of priority from European Patent Application No. EP23164515.1 filed on Mar. 28, 2023, the entire content of which is incorporated herein by reference.

A system and method for providing domestic hot water and/or space heating within a building is provided. The system comprises at least one storage vessel comprising a removable cover, wherein an internal volume of the at least one storage vessel is fluidly connected to a source of sewage and/or wastewater from one or more buildings, a water-source heat pump, at least one solar thermal collector, at least one heat transfer circuit, wherein the at least one heat transfer circuit comprises at least one fluid line containing a heat transfer fluid, and a controller for controlling an operation of the system. The system comprises an operation mode in which the controller of the system is configured to connect the at least one solar thermal collector to the at least one storage vessel via the at least one fluid line, wherein the system is configured to store a heat output from the at least one solar thermal collector in sewage and/or wastewater present in the internal volume of the at least one storage vessel. Moreover, a removable cover of a storage vessel is provided.

Wastewater streams discharged from buildings often contain useful thermal energy at a range of temperatures, depending on the source (washing machine, shower, bath, toilet etc.). This thermal energy is usually not recovered. Solar-thermal hot water and heating systems often operate periodically because of the intermittency of solar energy. This can be addressed by including thermal energy storage, either located indoors or outdoors. However, this often involves installing a dedicated thermal storage tank or vessel specifically for this purpose, which requires additional space.

Many homes in rural areas that are not connected to a sewer network have buried cesspools or septic tanks for sewage and wastewater storage. These tanks are typically emptied periodically (e.g. once per year). Thermal energy stored in the waste material discharged to the tank is usually not recovered and is wasted. Heat recovery from sewage or wastewater streams is difficult due to the danger of contamination between effluent and potable water streams. Integrating a heat exchanger within a cesspool or septic tank is made difficult by the presence of solid effluent that can 'cake' the surface of the heat exchanger, thus impeding heat transfer. Moreover, there is a requirement for periodic emptying of the tank, and in particular, digging out the solid effluent from the bottom of the tank. This procedure could be complicated by the presence of heat exchangers in the tank.

Installing purpose-built underground thermal storage tanks can be expensive which would also make a device that can be easily retrofitted to an existing cesspool or septic tank to convert it into a thermal storage tank highly desirable.

In the prior art, a system for providing domestic hot water and/or space heating within a building that comprises at least one solar thermal collector, a heat pump and a means for storing thermal energy in a storage vessel is known (e.g. CN 1865783 A). However, said system has the disadvantage that it is costly to manufacture and requires a large installation space because, for storing thermal energy, said system makes use of a large water storage tank that have to be set up as a part of this system when installing this system and which occupies a large space within a building.

In view of the above, it was the object of the present invention to provide a system and method for providing domestic hot water and/or space heating within a building that does not have at least one of the disadvantages of the prior art, as well as a means to allow an easy and rapid cleaning of storage vessels, in which solar thermal energy is stored in the sewage or wastewater medium. Preferably, the system and method should allow the provision a system for providing domestic hot water and/or space heating within a building which can be provided in a less-costly manner and requires a smaller installation space in the building. Preferably, an efficient operation of the solar thermal collector even at lower temperatures should be possible.

The object is solved by the system having the features of claim 1, the removable cover of a storage vessel having the features of claim 13 and the method having the features of claim 14. The dependent claims show advantageous embodiments.

According to the invention, a system for providing domestic hot water and/or space heating within a building is provided, comprising:
  a) at least one storage vessel comprising a removable cover, wherein an internal volume of the at least one storage vessel is fluidly connected to a source of sewage and/or wastewater from one or more buildings,
  b) a water-source heat pump,
  c) at least one solar thermal collector,
  d) at least one heat transfer circuit, wherein the at least one heat transfer circuit comprises at least one fluid line containing a heat transfer fluid,
  e) a controller for controlling an operation of the system, characterized in that the system comprises an operation mode in which the controller of the system is configured to connect the at least one solar thermal collector to the at least one storage vessel via the at least one fluid line, wherein the system is configured to store a heat output from the at least one solar thermal collector in sewage and/or wastewater present in the internal volume of the at least one storage vessel.

The system according to the invention has the advantage that the system can be provided at lower costs than systems of the prior art and requires less installation space. The reason is that the system makes use of at least one storage vessel which is fluidly connected to a source of sewage and/or wastewater from one or more buildings, i.e. the system makes use of at least one storage vessel which is already in existence when the system is set up and which does not occupy a large space in the building because it is either located outside of the building (e.g. if the storage vessel is a cesspool, a septic tank and/or a grease trap of the building) or is located inside of a building but does not occupy an additional large volume there (e.g. if the storage vessel is a sump chamber of a building). Furthermore, if heat stored in the at least one storage vessel is extracted, the at least one solar thermal collector can be operated very efficiently even at lower temperatures.

The system can be configured to maintain the at least one storage vessel at temperatures below 15° C. This has the advantages that minimal heat losses to the surrounding (e.g. surrounding ground) are ensured, and a low return temperature to the at least one solar thermal collector is also ensured. This in turn results in a 2-3 times higher solar collection yield than if the solar thermal collector was used to provide domestic hot water heating directly, at temperatures >50° C.

In the system, the least one storage vessel can comprise or consist of a cesspool, a septic tank, a sump chamber and/or a grease trap, optionally a cesspool, a septic tank and/or a sump chamber. Preferably, the grease trap is an additional storage vessel of the system.

A cesspool is a holding tank, usually underground, for sewage and wastewater. It typically has one pipe connection fitted at the inlet of the tank, with all the waste coming from the property retained within the tank. Cesspools require period emptying by a sewage disposal tanker every other month or so depending on the volume of the cesspool and degree of usage. If the at least one storage container is a cesspool, the internal volume of the cesspool can be in the range of ≥2.5 m3, preferably ≥4 m3, more preferably ≥5 m3, even more preferably ≥6 m3.

A septic tank or septic chamber, unlike a cesspool, has two pipe connections: one is the inlet and the other is the outlet. The effluent is discharged out of the septic tank into a soakaway, often made of a perforated pipe laid on a gravel bed. The tank has a partition wall, called a baffle. The baffle retains the suspended solids in the tank, within the primary chamber, leaving the liquid effluent to flow into the second-ary chamber. Like a cesspool, a septic tank needs to be emptied by a disposal tanker but less frequently because some of the effluent is continuously being discharged to the soakaway. If the at least one storage vessel is a septic chamber, the internal volume of the septic chamber can be in the range of ≥2.5 m3, preferably ≥4 m3, more preferably ≥5 m3, even more preferably ≥6 m3.

A grease trap prevents grease and fat from clogging a drainage pipework. A grease trap is designed with baffles to allow the grease and scum to separate, and a manhole cover is included to allow this floating matter to be periodically scraped off from the top. The greywater leaving the grease trap is then collected, together with the sewage water from toilets, in a septic tank located downstream (sewage water usually bypasses the grease trap and passes directly to the septic tank). If the at least one storage container is a grease trap, the internal volume of the grease trap can be in the range of ≥0.5 m3.

A sump chamber can be used where a bathroom or toilet is below ground floor level (i.e. at basement level) and wastewater must be collected and then be pumped above ground level before discharging to a sewer. A sump chamber may also be used to collect rainwater or groundwater if a basement is below the water table. The sump chamber usually contains a submersible pump for pumping out the collected fluid to the sewer. Typically sump chamber vol-umes are of the order of hundreds of litres, but for larger commercial buildings volumes can be several cubic metres. For this type of internal application, ensuring a good seal to prevent leakage of smells into the building is more critical than for an outdoor cesspool. If the at least one storage vessel is a sump chamber, the internal volume of the sump chamber can be in the range of ≥200 dm3, preferably ≥500 dm3, more preferably ≥1 m3, even more preferably ≥2 m3.

To estimate the amount of thermal energy storage that can be provided per volume of the at least one storage vessel, a simple calculation can be performed by considering that 1 cubic metre of water heated by 10 K can store approximately 11.5 kWh of heat. Thus, for example a typical 4 m3 cesspool, approximately half-full, and maintained within a temperature range of 0-15° C. could provide a thermal storage capacity of 35 kWh. A typical household in the UK uses about 10 kWh thermal energy per day for domestic hot water heating, thus indicating that this storage volume could be sufficient for intra-week storage. However, if it is also assumed that the stored effluent can be cooled further to a partially-frozen slurry state, a far larger thermal storage capacity can be obtained. By freezing just 10% of the volume of the store, the thermal storage capacity could be increased by more than 4 times to 160 kWh/m3, thus making it potentially suitable for intra-month storage.

Depending on the size of the storage vessel and the thermal energy requirements of the house, this thermal energy store could provide storage for periods ranging from a few days to several weeks. In either case, this enables more effective usage of intermittent solar thermal energy than is easily achievable with a small buffer tank installed in a home (typically 150-500 L). In fact, this enables surplus solar energy stored on sunny days to be used for heating on days with low solar availability. The use of a buried septic tank for thermal storage reduces the storage volume requirement inside the house, which often presents a limitation due to available space. Furthermore, this also inherently allows waste heat to be recovered from wastewater streams leaving the house, which can be at temperatures >30° C. for showers and baths.

In the system, the at least one storage vessel can comprise a temperature sensor, preferably in the internal volume of the at least one storage vessel, wherein the temperature sensor is connected to the controller. The advantage is that the temperature of the at least one storage vessel can be moni-tored and used for controlling the system.

The heat pump of the system can be configured to exchange heat with the at least one heat transfer circuit and a heating circuit suitable for providing domestic hot water and/or space heating within a building. The advantage is that the heat pump can efficiently use thermal energy provided by the at least one storage vessel and the at least one solar thermal collector by upgrading the thermal energy to a useful temperature before delivering it directly to the heating circuit for providing domestic hot water and/or space heat-ing within a building.

Preferably, the heat pump comprises a first heat exchanger and a second heat exchanger, wherein the first heat exchanger is configured to exchange heat between a work-ing-fluid circuit of the heat pump and the at least one heat transfer circuit of the system and wherein the second heat exchanger is configured to exchange heat between the at least one working-fluid circuit of the heat pump and a heating circuit for providing domestic hot water and/or space heating within a building.

In the operation mode of the system, the controller of the system is preferably configured to connect the at least one solar thermal collector to the at least one storage vessel via the at least one fluid line by bypassing the heat pump. This has the advantage that, when there is no concurrent demand for heating in the building, a transfer of heat energy from the at least one solar thermal collector to the at least one storage vessel is possible (charging of the at least one storage vessel) and the at least one storage vessel can be more efficiently charged with heat energy.

The system preferably comprises a further operation mode in which the controller of the system is configured to connect the at least one storage vessel to the heat pump via the at least one fluid line, preferably by bypassing the at least one solar thermal collector, wherein the controller of the system is configured to direct a heat output from the at least one storage vessel to the heat pump. The heat pump can be controlled by the controller to upgrade the heat output from the at least one storage vessel. This has the advantage that, when there is a concurrent demand for heating in the building and an insufficient availability of solar-thermal energy, a transfer of heat energy from the at least one storage vessel to the heat pump is possible (discharging of the at least one storage vessel) and the at least one storage vessel can be more efficiently operated at lower temperatures.

Moreover, the system preferably comprises a further operation mode in which the controller of the system is configured to connect the at least one solar thermal collector to the heat pump via the at least one fluid line, preferably by bypassing the at least one storage vessel, optionally bypassing any storage vessel of the system, wherein the controller of the system is configured to direct a heat output from the at least one solar thermal collector to the heat pump. The heat pump can be controlled by the controller to upgrade the heat output from the solar thermal collector. This has the advantage that, when there is a concurrent demand for heating in the building and a sufficient availability of solar-thermal energy from the solar collector array, a transfer of heat energy from at least one solar thermal collector to the heat pump is possible, thereby reducing exergy losses due to storing the solar thermal energy in the storage vessel.

The system can comprise valves, wherein the controller is configured to control a switching of the valves to switch between operation modes of the system.

The at least one solar thermal collector of the system can be fluidly connected in parallel to the at least one fluid line of the at least one heat transfer circuit, preferably via a first fluid line upstream of the heat pump and via a second fluid line downstream of the heat pump.

Moreover, the at least one solar thermal collector of the system can comprise a first valve, preferably in a first fluid line of the at least one solar thermal collector.

Furthermore, the at least one solar thermal collector of the system can comprise a second valve, preferably in a second fluid line of the at least one solar thermal collector.

Besides, the at least one solar thermal collector of the system can comprise a pump, preferably in a first fluid line or in a second fluid line of the at least one thermal collector.

Apart from the above, the at least one solar thermal collector of the system can comprise a temperature sensor, preferably at an outlet of the at least one solar thermal collector, wherein the temperature sensor is connected to the controller. The advantage is that the temperature of the at least one solar thermal collector can be monitored and used for controlling the system.

The at least one heat transfer circuit of the system can comprise a pump for circulating the heat transfer fluid.

Moreover, the at least one heat transfer circuit of the system can comprise a first valve and a second valve, wherein preferably a first fluid line of the at least one solar thermal collector connects to the heat transfer circuit at a point located between the first valve and the second valve.

Furthermore, the at least one heat transfer circuit of the system can comprise a third valve and a fourth valve, wherein preferably a second fluid line of the at least one solar thermal collector connects to the heat transfer circuit at a point located between the third valve and the fourth valve.

Besides, the at least one heat transfer circuit of the system can comprise a fluid line which extends into the internal volume of the at least one storage vessel, wherein the fluid line is preferably realized as a flexible tubing. This has the advantage that no additional heat exchanger is needed at the boundary of the storage vessel, i.e. thermal energy is directly transferred to the heat exchanger element inside the storage vessel and extracted therefrom by the fluid line.

The at least one storage vessel can comprise a heat exchanger configured to exchange heat between the heat transfer fluid of the at least one heat transfer circuit on the one hand and sewage and/or wastewater contained in the at least one storage vessel on the other hand.

This has the advantage that a risk of possible contamination of the heat transfer fluid within the at least one fluid line of the heat transfer circuit with liquid inside the storage vessel is reduced.

The heat exchanger can be configured to be removable from the at least one storage vessel. The advantage is that an easier and faster cleaning of the interior of the storage vessel is made possible because settled solids can be periodically dug out from the bottom of the storage vessel without damaging the heat exchanger.

The heat exchanger is preferably integrated with the removable cover of the at least one storage vessel, more preferably attached to the removable cover of the at least one storage vessel, optionally via a reversible friction locking. This allows an even faster and easier cleaning of the interior of the storage vessel because the heat exchanger can be removed together with the removable cover in one single step. The heat exchanger can be a loop heat pipe heat exchanger integrated into the manhole cover of the at least one storage vessel. When the manhole cover is removed, the heat exchanger is also easily removed from the tank.

The heat exchanger can comprise a heat pipe or a flexible tube, extending into the internal volume of the at least one storage vessel.

In an optional embodiment, the system comprises, in addition to the at least one storage vessel, a grease trap comprising a removable cover, wherein an internal volume of the grease trap is fluidly connected to a source of sewage and/or wastewater from one or more buildings, wherein the heat transfer circuit is configured to selectively transfer heat between the heat pump, the at least one thermal collector, the at least one storage vessel and the grease trap. The advantage is that a more effective recovery of waste heat from greywater can be achieved, as greywater entering the grease trap directly from shower and bath appliances is likely to be at a higher temperature. However, the grease trap is typically smaller in volume than the cesspool or septic tank located downstream (typically about 500 L).

The grease trap can be located downstream of the source of sewage and/or wastewater from one or more buildings.

Moreover, the grease trap can be located upstream of the at least one storage vessel if the at least one storage vessel is a cesspool or septic tank.

Furthermore, the grease trap can be located downstream of the at least one storage vessel if the at least one storage vessel is a sump chamber.

Besides, the grease trap can comprise a temperature sensor, preferably in the internal volume of the grease trap. The advantage is that a temperature of the interior of the grease trap can be monitored and used for controlling the system.

Besides, the grease trap can comprise a heat exchanger configured to exchange heat between the heat transfer fluid of the at least one heat transfer circuit on the one hand and sewage and/or wastewater contained in the grease trap on the other hand.

Preferably, the heat exchanger is configured to be removable from the grease trap. The advantage is that an easier and faster cleaning of the interior of the grease trap is made possible.

The heat exchanger can be integrated with the removable cover of the grease trap, more preferably attached to the removable cover of the grease trap, optionally via a reversible friction locking. This allows an even faster and easier cleaning of the interior of the grease trap because the heat exchanger can be removed together with the removable cover in one single step.

The heat exchanger can comprise a heat pipe or a flexible tube, extending into the internal volume of the grease trap.

The heat exchanger of the grease trap can be connected to the at least one heat transfer circuit in parallel to the heat exchanger in the at least one storage vessel.

Preferably, the grease trap heat exchanger is connected to the at least one heat transfer circuit via a first fluid line upstream of the at least one storage vessel, wherein the at least one fluid line of the at least one heat transfer circuit preferably comprises a valve downstream of the connection to the first fluid line and upstream of the at least one storage vessel.

Moreover, the grease trap heat exchanger can be connected to the at least one heat transfer circuit via a second fluid line downstream of the at least one storage vessel, wherein the at least one fluid line of the at least one heat transfer circuit preferably comprises a valve upstream of the connection to the second fluid line and downstream of the at least one storage vessel.

Furthermore, the grease trap can comprise a first valve, preferably in a first fluid line of the grease trap heat exchanger.

Apart from the above, the grease trap can comprise a second valve, preferably in a second fluid line of the grease trap heat exchanger.

The system can comprise additional operation modes which are identical to the operation modes described above with the exception that heat energy is transported between the grease trap and the heat pump or the at least one solar thermal collector, instead of heat energy being transported between the at least one storage vessel and the heat pump or the at least one solar thermal collector.

In this context, the system preferably comprises an operation mode in which the controller of the system is configured to connect the grease trap to the heat pump via the at least one fluid line, preferably by bypassing the at least one storage tank and the at least one solar thermal collector. This has the advantage that, when there is a concurrent demand for heating in the building and an insufficient availability of solar-thermal energy and a higher potential (temperature) of stored thermal energy in the grease trap than in the storage vessel, a transfer of heat energy from the grease trap to the heat pump is possible (discharging of the grease trap) and the grease trap can be more efficiently operated at lower temperatures.

The controller of the system can be configured to control the operation of the system based on temperature information provided by at least one temperature sensor of the system.

Furthermore, the controller can be configured to obtain temperature information of a temperature sensor of the at least one solar thermal collector and of a temperature sensor of the at least one storage vessel, optionally also of a temperature sensor of a grease trap of the system.

Moreover, the controller can be configured to control at least one pump and/or at least one valve of the system based on the temperature information.

The controller can be configured to connect the at least one solar thermal collector with the at least one storage vessel to transfer heat to the storage vessel when there is no demand for domestic hot water and/or space heating and when a temperature of the heat transfer fluid at an outlet of the at least one solar thermal collector is higher than a temperature of sewage and/or wastewater in the internal volume of the at least one storage vessel, optionally also higher than a temperature in the internal volume of a grease trap of the system.

Moreover, the controller can be configured to connect the at least one storage vessel with the heat pump to extract heat from the at least one storage vessel when there is a demand for domestic hot water and/or space heating and when a temperature of sewage and/or wastewater in the internal volume of the at least one storage vessel is higher than a temperature of the heat transfer fluid at an outlet of the at least one solar thermal collector, optionally also higher than a temperature in the internal volume of a grease trap of the system.

Furthermore, the controller can be configured to connect a grease trap of the system with the heat pump to extract heat from the grease trap when there is a demand for domestic hot water and/or space heating and when a temperature of sewage and/or wastewater in the internal volume of the grease trap is higher than a temperature of the heat transfer fluid at an outlet of the at least one solar thermal collector.

Besides, the controller can be configured to connect the at least one solar thermal collector with the heat pump to extract heat from the at least one solar thermal collector when there is a demand for domestic hot water and/or space heating and when a temperature at an outlet of the at least one solar thermal collector is higher than a temperature of sewage and/or wastewater in the internal volume of the at least one storage vessel, optionally also higher than a temperature in the internal volume of a grease trap of the system.

The heat transfer fluid of the system can comprise or consist of water.

According to the invention, a removable cover (or lid) of a storage vessel is provided, wherein the storage vessel is selected from the group consisting of cesspool, septic tank, sump chamber and grease trap, characterized that a heat exchanger is integrated with the removable cover.

The advantage of the removable cover is that it allows an easy and rapid cleaning of the interior of the storage vessel because the heat exchanger can be removed with the cover from the storage vessel in one step.

The removable cover of the storage vessel can comprise a protective cage around the heat exchanger, wherein the protective cage preferably comprises or consists of a mesh, e.g. a metal mesh, a plastic material mesh (e.g. a HDPE mesh, PTFE mesh or ABS mesh), a carbon fibre mesh or a glass fibre mesh. The protective cage can protect the heat exchanger from fouling by the solid effluent.

According to the invention, a method for providing domestic hot water and/or space heating within a building is provided, comprising using the system according to the present invention for providing domestic hot water and/or space heating within a building.

The method can comprise connecting the at least one solar thermal collector with the at least one storage vessel to transfer heat to the at least one storage vessel when there is no demand for domestic hot water and/or space heating and when a temperature of the heat transfer fluid at an outlet of the at least one solar thermal collector is higher than a temperature of sewage and/or wastewater in the internal volume of the at least one storage vessel, optionally also higher than a temperature in the internal volume of a grease trap of the system.

Moreover, the method can comprise connecting the at least one storage vessel with the heat pump to extract heat from the at least one storage vessel when there is a demand for domestic hot water and/or space heating and when a temperature of sewage and/or wastewater in the internal volume of the at least one storage vessel is higher than a temperature of the heat transfer fluid at an outlet of the at least one solar thermal collector, optionally also higher than a temperature in the internal volume of a grease trap of the system.

Furthermore, the method can comprise connecting a grease trap of the system with the heat pump to extract heat from the grease trap when there is a demand for domestic hot water and/or space heating and when a temperature of sewage and/or wastewater in the internal volume of the grease trap is higher than a temperature of the heat transfer fluid at an outlet of the at least one solar thermal collector and (if the grease trap is an additional storage vessel of the system) is higher than a temperature of sewage and/or wastewater in the internal volume of the at least one storage vessel (being e.g. a cesspool, a septic tank or a sump chamber).

Besides, the method can comprise connecting the at least one solar thermal collector with the heat pump to extract heat from the at least one solar thermal collector to (an evaporator of) the heat pump via the heat transfer circuit, when there is a demand for domestic hot water and/or space heating and when a temperature at an outlet of the at least one solar thermal collector is higher than a temperature of sewage and/or wastewater in the internal volume of the at least one storage vessel, optionally also higher than a temperature in the internal volume of a grease trap of the system.

With the following Figures, the subject-matter of the invention is explained in more detail without wishing to limit the subject-matter of the invention to the specific embodiments shown here.

FIG. 1 schematically shows a system according to the present invention. The system comprises at least one storage vessel 1 (in this case: a cesspool) which is located below the ground level 9. The storage vessel 1 comprises a removable cover 2, wherein an internal volume of the storage vessel 1 is fluidly connected to a source 3 of sewage and/or wastewater from one or more buildings. The system further comprises a water-source heat pump 4, at least one solar thermal collector 5 and at least one heat transfer circuit 6, wherein the at least one heat transfer circuit 6 comprises at least one fluid line 7 containing a heat transfer fluid. Moreover, the system comprises a controller (not shown) for controlling an operation of the system. The system is characterized in that the at least one heat transfer circuit 6 is configured such that the heat pump 4 receives thermal energy at least from the at least one solar thermal collector 5, wherein the heat pump 4 is configured to upgrade a heat output from the at least one solar thermal collector 5. In the system, the heat transfer fluid is circulated at least by a first pump P1 and a second pump P2. The solar thermal collector 5 can transfer heat either directly or indirectly to the circulating heat transfer fluid. An evaporator of the heat pump 4 receives thermal energy from the circulating heat transfer fluid, and the condenser of the heat pump 4 discharges thermal energy at a higher temperature to a secondary heat transfer fluid circuit which circulates in the building to provide useful heating, e.g., for space heating and/or domestic hot water heating. In this example, the storage vessel 1 comprises a heat exchanger 8, wherein heat is transferred from the effluent material stored in the storage vessel 1 to the circulating heat transfer fluid. It is beneficial if the heat exchanger 8 is removable to assist cleaning of the interior of the storage vessel 1. The controller of the system can be configured to enable an operation mode of the system to be switched from a solar heat storage mode to a stored heat extraction mode, based on the current state of the system.

Figure 2:
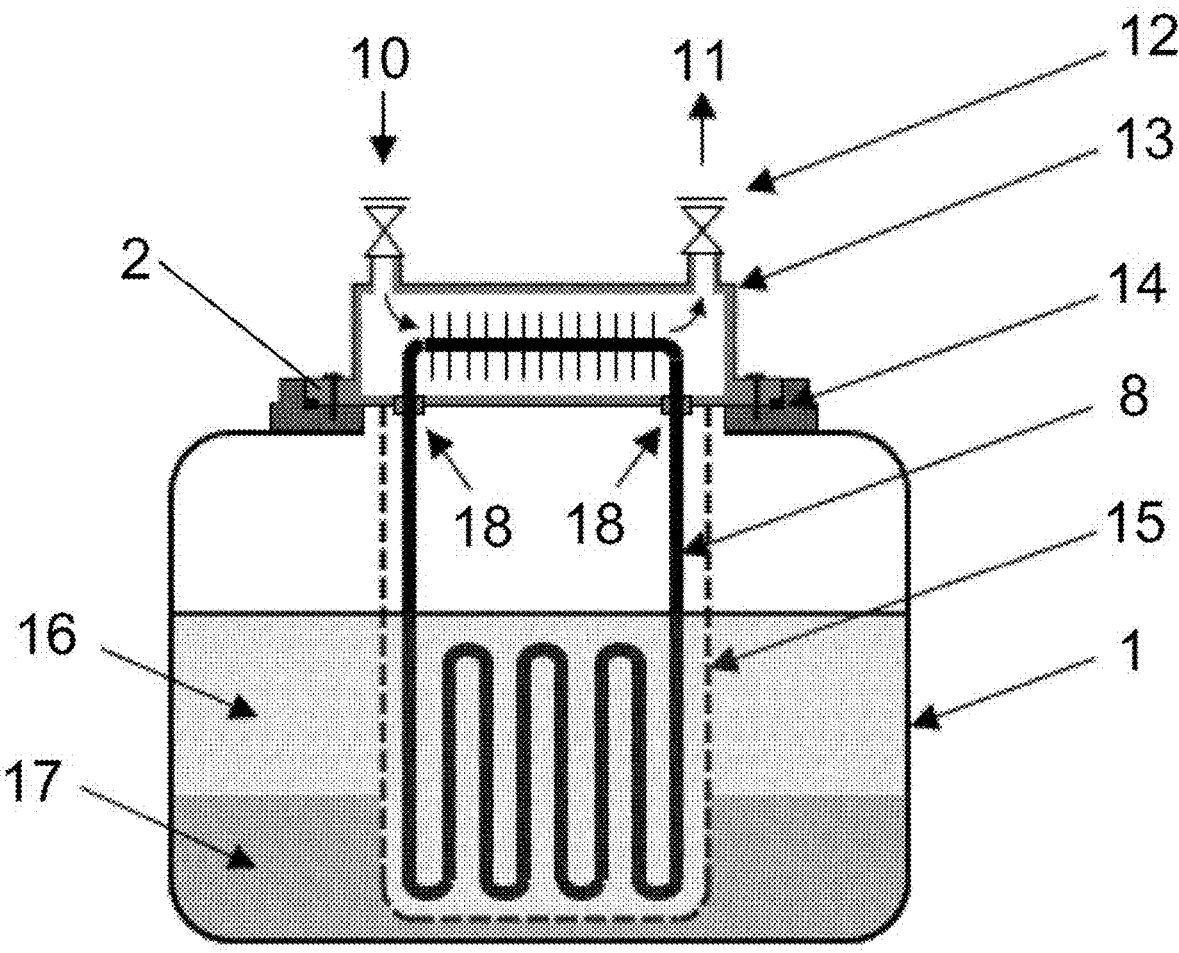

FIG. 2 schematically shows a removable cover 2 according to the present invention which covers the opening of the storage container 1. Here, a shell-and-tube heat exchanger 8 is integrated into the cover (lid) of a storage vessel 1 and the storage vessel 1 is a cesspool. The heat transfer fluid flows into the inlet 10 of the heat exchanger 8 through the shell of the heat exchanger 8, in contact with the tube section of the heat exchanger 8, which optionally may be of a finned design. The tube section of the heat exchanger 8 optionally may be a reversible loop heat pipe that delivers heat to or from the liquid effluent 16 and/or solid effluent 17 in the storage vessel 1 via evaporation and condensation of a two-phase fluid inside the tube of the tube section of the heat exchanger 8. Then, the heat transfer fluid flows out of the heat exchanger 8 through the outlet 11 of the heat exchanger. By integrating the heat exchanger 8 into the manhole cover 13 of the storage vessel 1, the heat exchanger 8 can be retrofitted to an existing storage vessel 1 (e.g. an existing cesspool or septic tank) simply by replacing its existing manhole cover 13. Flanged connections 12 and isolating valves should be included to allow disconnection of the heat transfer fluid circuit when removing the manhole cover 13 and the heat exchanger 8. Grommets 18 provide a seal where the heat pipe tubing of the heat exchanger 8 penetrates the shell of the heat exchanger 8. The cover 2 of the storage vessel can comprise a protective cage 15 around the heat exchanger 8 with a suitably sized mesh. The protective cage 15 serves to protect the heat exchanger 8 from fouling by the solid effluent 17.

Figure 3:
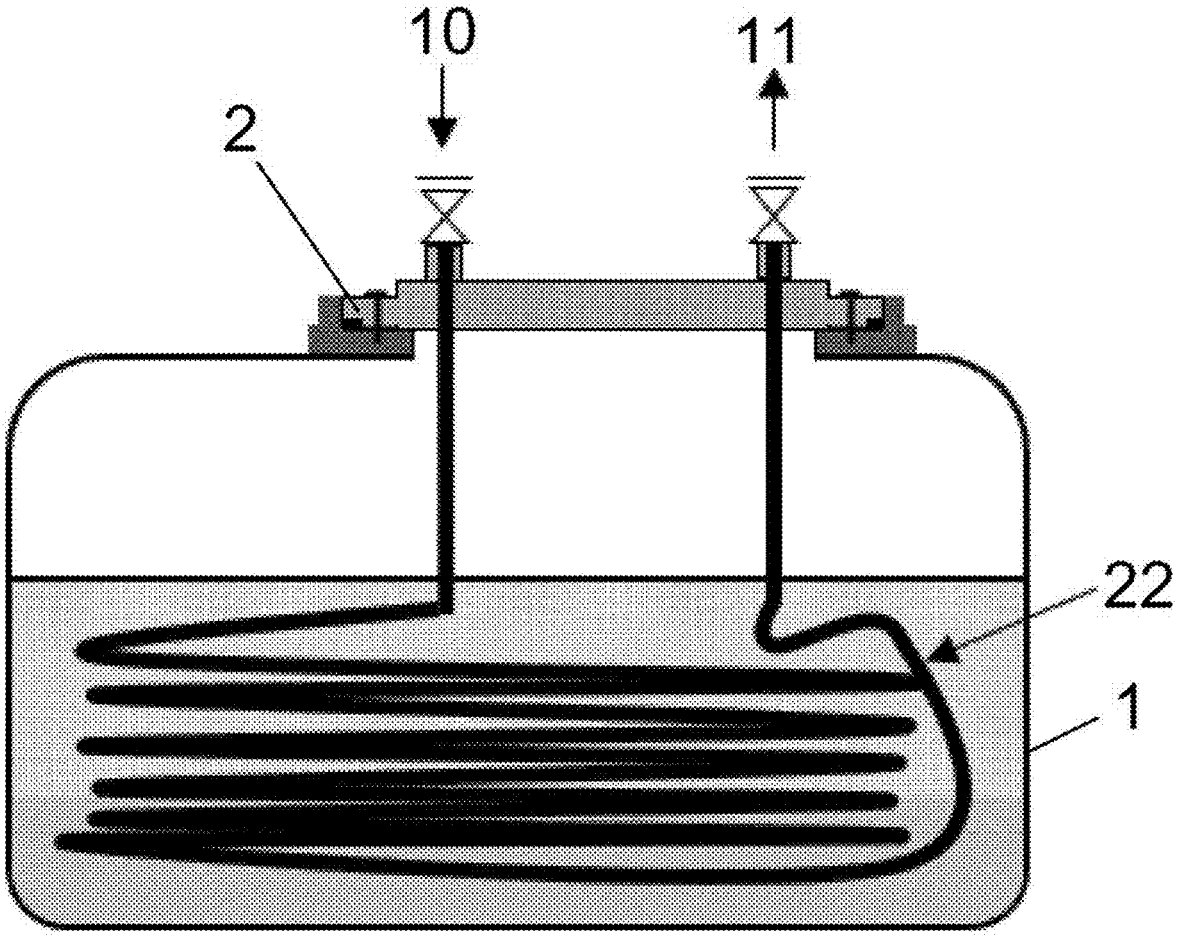

FIG. 3 schematically shows a removable cover 2 according to the present invention which covers the opening of the storage container 1. The removable cover 2 is similar to the removable cover shown in FIG. 2 with the following exception: The removable cover 2 of the storage vessel 1 (cesspool) does not comprise a heat exchanger, but is equipped with a heat exchange coil 22 (e.g. a flexible tube) instead to enable heat transfer. It can be beneficial if the heat exchange coil 22 comprises a flexible tube, e.g. a polymer or metal. This flexible coil can be removable with the cover 2 to periodically dig out solid effluent from the bottom of the storage vessel 1. This heat exchanger can be fluidly connected to the main heat transfer circuit of the system. In a further alternative embodiment (not shown), the heat exchange coil 22 can be separated from the main heat transfer circuit of the system by a heat exchanger, e.g. plate heat exchanger, between the main heat transfer circuit of the system and the coil's heat transfer circuit. An additional pump would then be required on the coil's heat transfer circuit. This alternative embodiment can be beneficial as it provides a further layer of separation between the sewage and/or wastewater in the storage vessel and the heating circuit in the building to avoid contamination in the event of a leakage.

Figure 4:
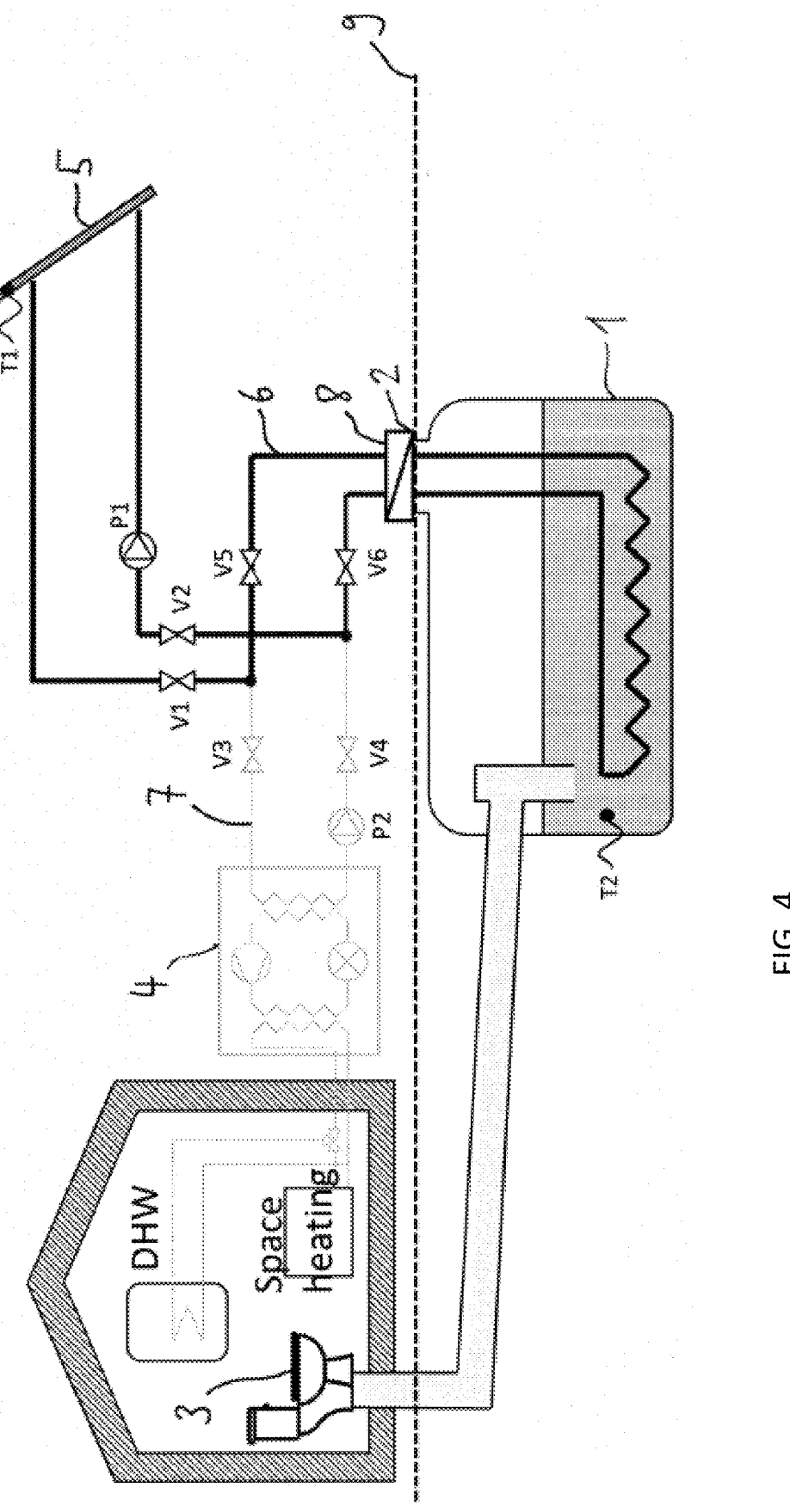

FIG. 4 schematically shows an Operation Mode 1 of a system according to the invention in which the storage device 1 is charged with solar thermal energy. Operation Mode 1 is activated when the heat pump is idle (there is no demand for heating to the building), and temperature measured by sensor T1 is higher than the temperature measured by sensor T2. In Operation Mode 1, pump P1 is switched ON, pump P2 is switched OFF, valves V1, V2, V5 and V6 are opened and valves V3 and V4 are closed (see thick lines depicting the flow of heat transfer fluid in this Operation Mode). This allows heat transfer fluid to flow from the solar collector to the heat exchanger in the cesspool, thereby storing solar thermal energy in the cesspool.

Figure 5:
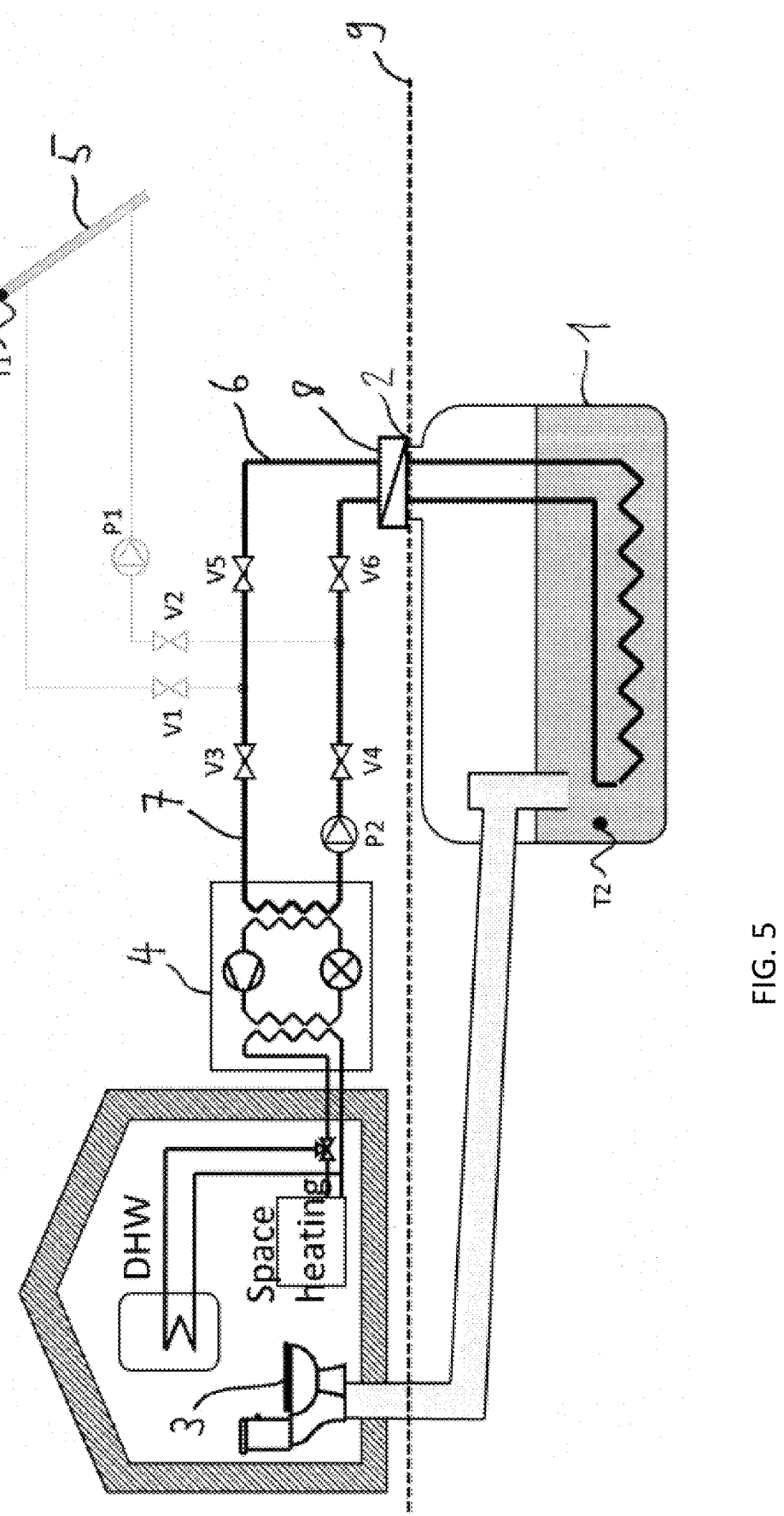

FIG. 5 schematically shows an Operation Mode 2 of a system according to the invention in which space heating and/or DHW is provided with the storage vessel 1 as heat source. Operation Mode 2 is activated when the heat pump receives a demand to provide heating for space heating and/or domestic hot water to the building, and when temperature measured by sensor T2 is higher than the temperature measured by sensor T1. In Operation Mode 2, pump P2 is switched ON, pump P1 is switched OFF, valves V3, V4, V5 and V6 are opened and valves V1 and V2 are closed (see thick lines depicting the flow of heat transfer fluid in this Operation Mode). This allows heat transfer fluid to flow from the heat exchanger in the cesspool to the heat pump evaporator, thereby discharging thermal energy from the thermal store.

Figure 6:
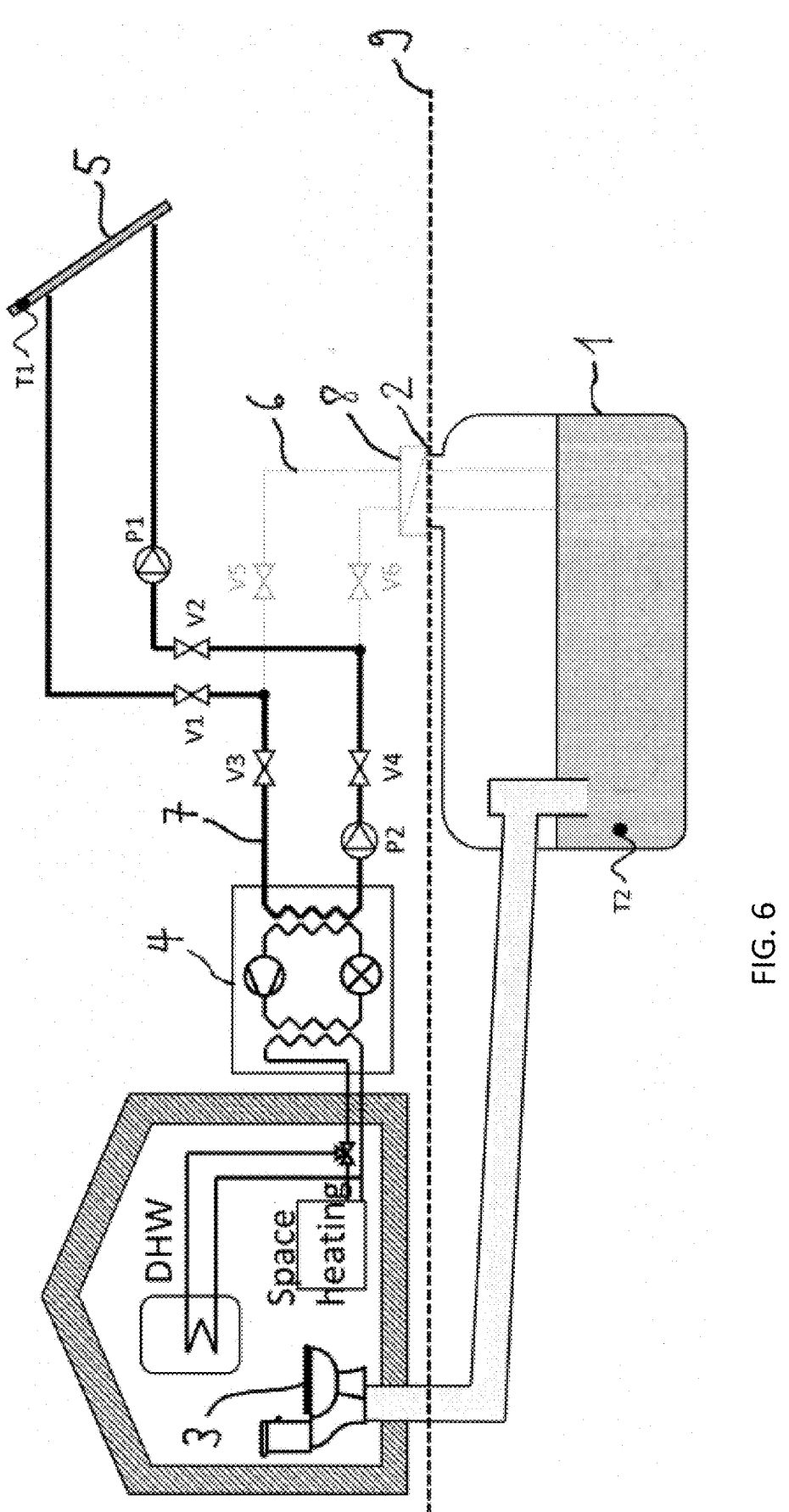

FIG. 6 schematically shows an Operation Mode 3 of a system according to the invention in which space heating and/or DHW is provided with the solar thermal collector as heat source. Operation Mode 3 is activated when the heat pump receives a demand to provide heating for space heating or domestic hot water to the building, and when temperature measured by sensor T1 is higher than the temperature measured by sensor T2. In Operation Mode 3, pumps P1 and P2 are switched ON, valves V1, V2, V3 and V4 are opened and valves V5 and V6 are closed (see thick lines depicting the flow of heat transfer fluid in this Operation Mode). This allows heat transfer fluid to flow from the solar collector to the heat pump evaporator.

Figure 7:
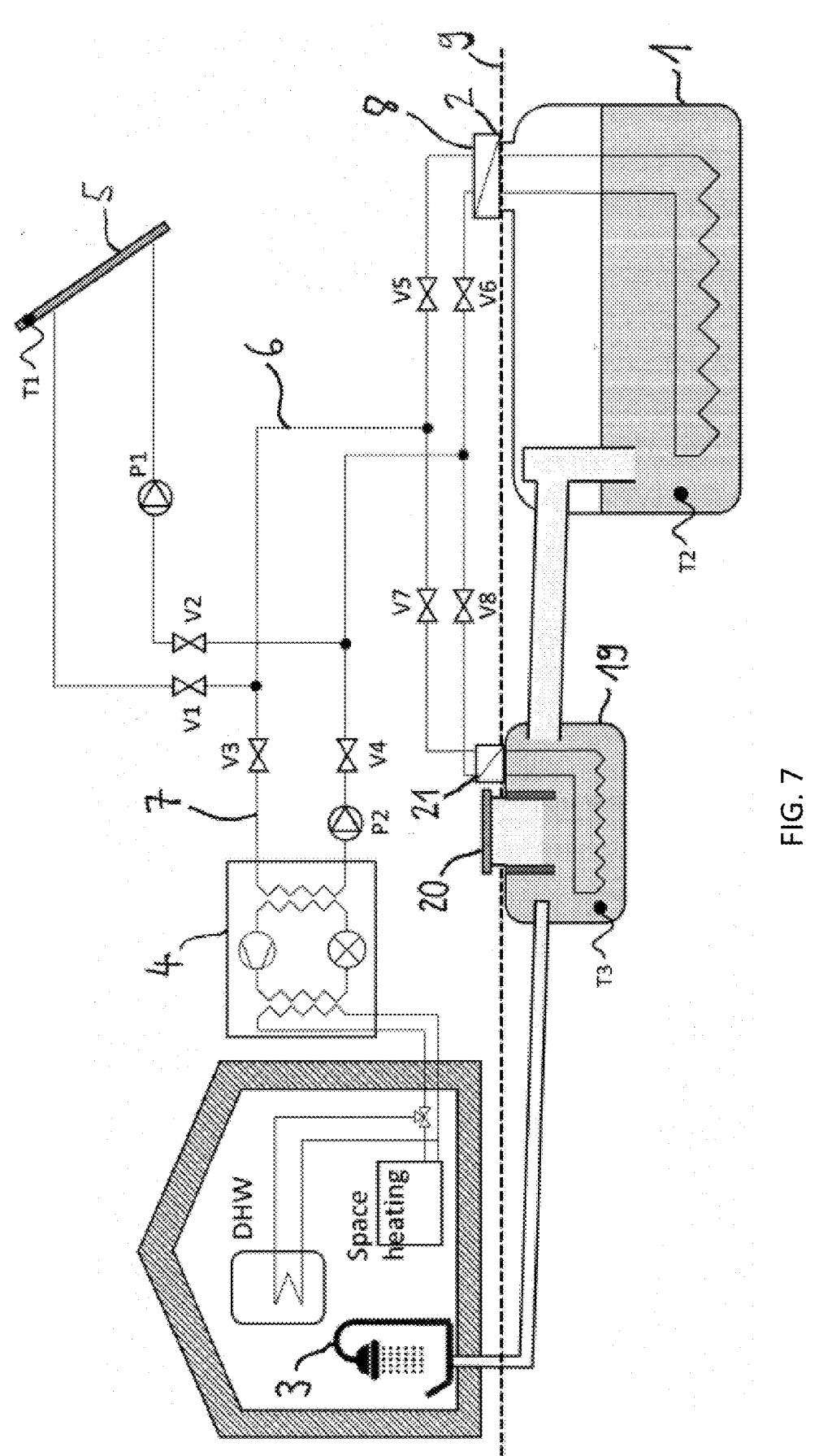

FIG. 7 shows a system according to the present invention. This system is similar to the system shown in FIG. 1 with the following exception: The system comprises, beside a storage vessel 1 (cesspool), a grease trap 19. The system is suitable for greywater heat recovery from grease trap 19 located upstream of the storage device 1 regarding a flow of sewage and/or wastewater from a source 3 of sewage and/or wastewater of at least one building. The system allows a more effective recovery of waste heat from greywater leaving the source 3 of sewage and/or wastewater from at least one building (e.g. shower or bath appliances). Here, a heat exchanger 22 (second stage heat exchanger) is incorporated into the grease trap 19. Two additional valves, V7 and V8 and an additional temperature sensor, T3, are also shown. For this system, Operation Modes 1, 2 and 3 are principally the same (see FIGS. 4 to 6), with valves V7 and V8 remaining closed for each of these previously described operation modes. However, there is an additional Operation Mode 4, which is described in FIG. 8.

Figure 8:
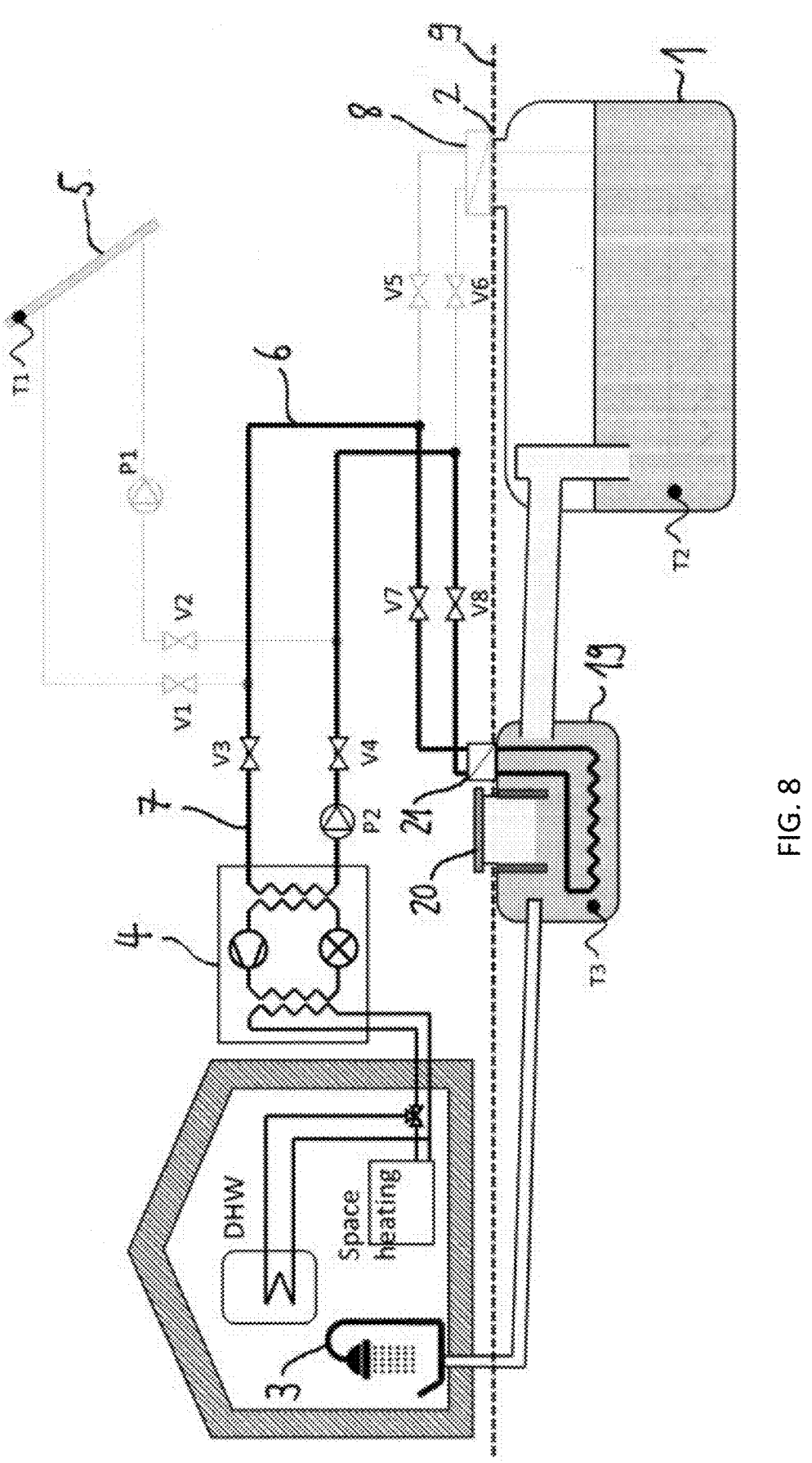

FIG. 8 shows an Operation Mode 4 of a system according to the invention as shown in FIG. 7 in which waste heat is recovered from greywater in grease trap 19. Operation Mode 4 is activated when the heat pump 4 receives a demand to provide heating for space heating and/or domestic hot water to the building, and when temperature measured by sensor T3 is higher than the temperatures measured by sensors T1 and T2. In Operation Mode 4, pump P2 is switched ON, pump P1 is switched OFF, valves V3, V4, V7 and V8 are opened and valves V1, V2, V5 and V6 are closed. This allows heat transfer fluid to flow from the heat exchanger 21 in the grease trap 19 to the heat pump 4 evaporator, thereby recovering waste heat from the grey water in the grease trap 19.

LIST OF REFERENCE SIGNS AND
ABBREVIATIONS

1: storage vessel (e.g. cesspool or septic tank);
2: removable cover of storage vessel;

3: source of sewage and/or wastewater from one or more buildings;
4: water-source heat pump;
5: solar thermal collector;
6: heat transfer circuit;
7: fluid line containing a heat transfer fluid;
8: (first) heat exchanger of storage vessel (e.g. heat pipe heat exchanger);
9: ground level;
10: inlet of (first) heat exchanger of storage vessel;
11: outlet of (first) heat exchanger of storage vessel;
12: flanged connection with isolating valves;
13: manhole cover;
14: gasket seal;
15: protective cage around the heat exchanger;
16: liquid effluent;
17: solid effluent;
18: grommet;
19: grease trap;
20: removable cover of grease trap;
21: heat exchanger of grease trap;
22: heat exchange coil (e.g. flexible tube);
T1: temperature sensor at solar thermal collector;
T2: temperature sensor at storage vessel;
T3: temperature sensor of the grease trap
P1: pump of solar thermal collector array;
P2: pump of heat transfer circuit;
V1, V2: valves in part of fluid line of heat transfer circuit connecting to solar thermal collector array;
V3, V4: valves in part of fluid line of heat transfer circuit connecting to heat pump;
V5, V6: valves in part of fluid line of heat transfer circuit connecting to storage vessel;
V7, V8: valves in part of fluid line of heat transfer circuit connecting to grease trap;
DHW: domestic hot water

The invention claimed is:

1. A system for providing domestic hot water and/or space heating within a building, comprising:
a) at least one storage vessel comprising a removable cover, wherein an internal volume of the at least one storage vessel is fluidly connected to a source of sewage and/or wastewater from one or more buildings,
b) a water-source heat pump,
c) at least one solar thermal collector,
d) at least one heat transfer circuit, wherein the at least one heat transfer circuit comprises at least one fluid line containing a first heat transfer fluid,
e) a controller for controlling an operation of the system,
wherein the at least one heat transfer circuit is coupled to a heat exchanger to exchange heat between the first heat transfer fluid and the sewage and/or wastewater,
wherein the heat exchanger is integrated with the removable cover such that the heat exchanger is removable from the at least one storage vessel together with the removable cover,
wherein the system comprises an operation mode in which the controller of the system is configured to connect the at least one solar thermal collector to the at least one storage vessel via the at least one fluid line,
wherein the system is configured to store a heat output from the at least one solar thermal collector in sewage and/or wastewater present in the internal volume of the at least one storage vessel, and
wherein the removable cover comprises:
a first inlet which receives the first heat transfer fluid which is transmitted to the heat exchanger;

a first outlet which transmits the first heat transfer fluid away from the heat exchanger;

a second inlet which receives a second heat transfer fluid from the storage vessel; and a second outlet which transmits the second heat transfer fluid back to the storage vessel, after the second heat transfer fluid exchanges heat with the heat exchanger.

2. The system according to claim 1, wherein the at least one storage vessel:

i) comprises a cesspool, a septic tank, a sump chamber and/or a grease trap; and/or ii) comprises a temperature sensor, in the internal volume of the at least one storage vessel, wherein the temperature sensor is connected to the controller.

3. The system according to claim 1, wherein:

the heat pump is configured to exchange heat with the at least one heat transfer circuit and a heating circuit suitable for providing the domestic hot water and/or the space heating within the building, the heat pump comprises a first heat exchanger and a second heat exchanger, wherein the first heat exchanger is configured to exchange heat between a working-fluid circuit of the heat pump and the at least one heat transfer circuit of the system, and the second heat exchanger is configured to exchange heat between the at least one working-fluid circuit of the heat pump and the heating circuit for providing the domestic hot water and/or the space heating within the building.

4. The system according to claim 1, wherein the system further comprises:

i) a further operation mode in which the controller of the system is configured to connect the at least one storage vessel to the heat pump via the at least one fluid line, by bypassing the at least one solar thermal collector, wherein the controller of the system is configured to direct a heat output from the at least one storage vessel to the heat pump; and/or ii) a further operation mode in which the controller of the system is configured to connect the at least one solar thermal collector to the heat pump via the at least one fluid line, by bypassing the at least one storage vessel, wherein the controller of the system is configured to direct a heat output from the at least one solar thermal collector to the heat pump.

5. The system according to claim 1, wherein;

the system comprises valves, and the controller is further configured to control a switching of the valves to switch between operation modes of the system.

6. The system according to claim 1, wherein the at least one solar thermal collector:

i) is fluidly connected in parallel to the at least one fluid line of the at least one heat transfer circuit via a first fluid line upstream of the heat pump and via a second fluid line downstream of the heat pump;

ii) comprises a first valve in a first fluid line of the at least one solar thermal collector; and/or iii) comprises a second valve in a second fluid line of the at least one solar thermal collector; and/or iv) comprises a pump in a first fluid line or in a second fluid line of the at least one thermal collector; and/or v) comprises a temperature sensor at an outlet of the at least one solar thermal collector, wherein the temperature sensor is connected to the controller.

7. The system according to claim 1, wherein the at least one heat transfer circuit:

i) comprises a pump for circulating the first heat transfer fluid; and/or ii) comprises a first valve and a second valve, wherein a first fluid line of the at least one solar thermal collector connects to the heat transfer circuit at a point located between the first valve and the second valve; and/or iii) comprises a third valve and a fourth valve, wherein a second fluid line of the at least one solar thermal collector connects to the heat transfer circuit at a point located between the third valve and the fourth valve; and/or iv) comprises a fluid line which extends into the internal volume of the at least one storage vessel, wherein the fluid line is realized as a flexible tubing.

8. The system according to claim 1, wherein:

the heat exchanger comprises a heat pipe or a flexible tube extending into the internal volume of the at least one storage vessel.

9. The system according to claim 1, wherein;

the at least one fluid line of the at least one heat transfer circuit is not fluidly connected to a water tank.

10. The system according to claim 1, wherein:

the controller is configured to control the operation of the system based on temperature information provided by at least one temperature sensor of the system, the controller being further configured to i) obtain the temperature information of a temperature sensor of the at least one solar thermal collector and of a temperature sensor of the at least one storage vessel, optionally also of a temperature sensor of a grease trap of the system; and/or ii) control at least one pump and/or at least one valve of the system based on the temperature information.

11. The system according to claim 1, wherein the controller is further configured to:

i) connect the at least one solar thermal collector with the at least one storage vessel to transfer heat to the storage vessel when there is no demand for domestic hot water and/or space heating and when a temperature of the first heat transfer fluid at an outlet of the at least one solar thermal collector is higher than a temperature of sewage and/or wastewater in the internal volume of the at least one storage vessel, optionally also higher than a temperature in the internal volume of a grease trap of the system; and/or ii) connect the at least one storage vessel with the heat pump to extract heat from the at least one storage vessel when there is a demand for domestic hot water and/or space heating and when a temperature of sewage and/or wastewater in the internal volume of the at least one storage vessel is higher than a temperature of the first heat transfer fluid at an outlet of the at least one solar thermal collector, optionally also higher than a temperature in the internal volume of a grease trap of the system; and/or iii) connect the at least one solar thermal collector with the heat pump to extract heat from the at least one solar thermal collector when there is a demand for domestic hot water and/or space heating and when a temperature at an outlet of the at least one solar thermal collector is higher than a temperature of sewage and/or wastewater in the internal volume of the at least one storage vessel, optionally also higher than a temperature in the internal volume of a grease trap of the system.

12. The system according to claim 1, wherein:

the first heat transfer fluid comprises water.

13. A removable cover of a storage vessel, the storage vessel is selected from the group consisting of cesspool, septic tank, sump chamber and grease trap, the removable cover comprising:

a heat exchanger integrated with the removable cover;

a first inlet which receives a first heat transfer fluid which is transmitted to the heat exchanger;

a first outlet which transmits the first heat transfer fluid away from the heat exchanger;

a second inlet which receives a second heat transfer fluid from the storage vessel; and a second outlet which transmits the second heat transfer fluid back to the storage vessel, after the second heat transfer fluid exchanges heat with the heat exchanger.

14. A method for providing domestic hot water and/or space heating within a building, comprising:

using the system according to claim 1 for providing domestic hot water and/or space heating within the building.

15. The method according to claim 14, further comprising:

i) connecting the at least one solar thermal collector with the at least one storage vessel to transfer heat to the at least one storage vessel when there is no demand for domestic hot water and/or space heating and when a temperature of the first heat transfer fluid at an outlet of the at least one solar thermal collector is higher than a temperature of sewage and/or wastewater in the internal volume of the at least one storage vessel, optionally also higher than a temperature in the internal volume of a grease trap of the system; and/or ii) connecting the at least one storage vessel with the heat pump to extract heat from the at least one storage vessel when there is a demand for domestic hot water and/or space heating and when a temperature of sewage and/or wastewater in the internal volume of the at least one storage vessel is higher than a temperature of the first heat transfer fluid at an outlet of the at least one solar thermal collector, optionally also higher than a temperature in the internal volume of a grease trap of the system; and/or iii) connecting the at least one solar thermal collector with the heat pump to extract heat from the at least one solar thermal collector to an evaporator of the heat pump via the heat transfer circuit, when there is a demand for domestic hot water and/or space heating and when a temperature at an outlet of the at least one solar thermal collector is higher than a temperature of sewage and/or wastewater in the internal volume of the at least one storage vessel, optionally also higher than a temperature in the internal volume of a grease trap of the system.

16. The system according to claim 1, wherein:

the heat exchanger includes fins which are in direct contact with the first heat transfer fluid.

17. A system comprising:

the removable cover according to claim 13; and the storage vessel which is selected from the group consisting of the cesspool, the septic tank, the sump chamber and the grease trap.

18. The system according to claim 17, wherein:

the heat exchanger includes fins which are in direct contact with the first heat transfer fluid.

\* \* \* \* \*